June 26, 1951  E. LABIN  2,557,979
FREQUENCY MODULATION
Filed Feb. 6, 1948
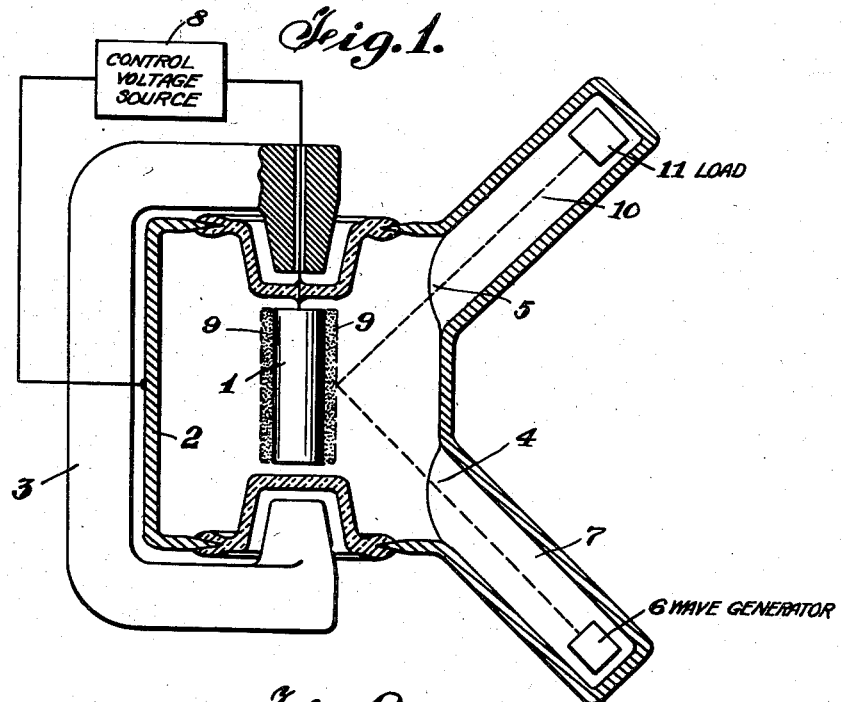
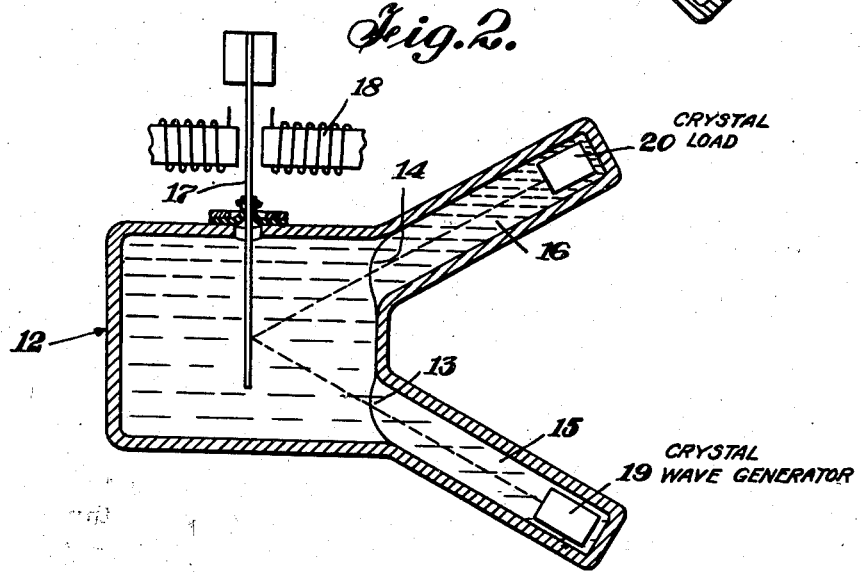
INVENTOR.
EMILE LABIN
BY
R P Morris
ATTORNEY Patented June 26, 1951

2,557,979

UNITED STATES PATENT OFFICE 2,557,979

FREQUENCY MODULATION

Emile Labin, New York, N. Y., assignor to Federal Telephone and Radio Corporation, New York, N. Y., a corporation of Delaware Application February 6, 1948, Serial No. 6,702

4 Claims. (Cl. 332—5)

This invention relates to systems for modulating electrical signals and particularly to a system of phase or frequency modulation wherein the principles of the Doppler effect are utilized.

The frequency of oscillation cannot be changed in a linear circuit when the circuit is stationary. Hence most known methods of frequency modulation introduce a non-linear circuit at the oscillator itself.

An object of the invention is to provide a signaling system comprising means for producing modulation effects by variations in the electrical length of a radiant energy path and more particularly by the reflection of radiant energy from a movable object.

In accordance with my invention, nonstationary elements are effectively introduced into a linear circuit. Whereas, in accordance with a known method, a movable element such as a condenser electrode may have its movement controlled by a modulation source in order to produce a phase modulation of an oscillatory source, my invention takes advantage of that principle by which the phase and/or frequency of a wave is effectively altered as the length of path between a transmitter and a reception point is varied. In carrying this principle into effect, that is, the variation in length of transmission path or, as generally stated, the relative motion of the two bodies concerned, I utilize a wave reflector, which may be caused to vibrate under control of a modulation signal. In a preferred embodiment of the present invention, a varying density and radius of a space charge is used for introducing the Doppler effect for producing modulation of electromagnetic waves. In a second embodiment mechanical displacement of a movable mirror is utilized for frequency or phase modulating a sound wave.

The above mentioned and other features and objects of this invention will become more apparent and the invention itself, though not necessarily defined by said features and objects, will be best understood by reference to the following description of an embodiment of the invention taken in connection with the accompanying drawings wherein:

Figure 1 shows an embodiment of applicant's invention utilizing a variable space charge layer for introducing the Doppler effect.

Figure 2 illustrates mechanical means for introducing the Doppler effect and effecting frequency of phase modulation of sound waves.

In a system exhibiting the Doppler effect, if the speed of the propagated waves used is "C," and the radial velocity of the reflector toward which the waves are directed is "V," then the variation $\Delta F$ from an initial frequency $F$ produced by reflection is given by the following equation.

$$\frac{\Delta F}{F} = \frac{2V}{C}$$

For electromagnetic waves, "C" is very high and therefore $$\frac{\Delta F}{F}$$

which can be generated with this method is very small. The effect desired which is measured by the ratio $\Delta F$ to $F$ should be generally in the order of $1/1000$ or $1/10,000$ in order to be large compared to the variations of $F$ due in instabilities of the oscillator. This means that the speed of displacement of the mobile element must be $1/2000$ or $1/20,000$ of the speed "C" of propagation of the waves used. In other words, if electromagnetic waves are used, where C is equal to $3 \times 10^{10}$ cm./sec., the speed of displacement has to be of the order of $10^6$ cm./sec. To achieve such high speeds of displacement by mechanical means is difficult. However, electronic means in which the density of space charge of an electron discharge device is made variable with time provides means for obtaining these high speeds.

Figure 1 shows a device having a type of construction similar to a cylindrical magnetron, comprising a cathode 1, an anode cylinder 2 and magnets 3. The anode cylinder 2 has an entrant and exit opening 4 and 5 respectively in the form of dielectric windows. An electromagnetic wave generator 6 is provided for transmitting electromagnetic waves through the wave guide 7 and entrant opening 4 towards the cathode 1. When a control voltage from source 8 is applied between the cathode 1 and anode 2, electrons are emitted by the cathode 1 and form a layer of space charge 9, substantially around the cathode 1. Depending upon the control voltage applied between 1 and 2, the radius of the space charge is different. If the space charge is dense enough, the incoming waves from source 6 will not penetrate through the space charge but will be reflected substantially at the surface. Thus the variable space charge layer is made to act as a movable mirror, the speed of variation in movement of which can be controlled by the control voltage applied to the anode 2. The electromagnetic waves of varying frequency reflected from this space charge mirror are passed through exit opening 9 and wave-guide 10 to a load such as 11 where they may be translated. Thus the control voltage signals are used to frequency or phase modulate the waves from source 6.

A similar arrangement can be used with sound waves, such as those for example termed supersonic, instead of electromagnetic waves. For sound waves in liquids, the speed of propagation is of the order of $1.5 \times 10^5$ cm./sec. only, and the same effect as previously obtained with electromagnetic waves can be obtained with speeds $10^5$ times lower. In other words, if displacements of 1 cm. of a mirror, which in this case is mechanical, are effected, the rate at which this displacement has to be made would be of the order of 10 per second instead of 1 million per second.

Figure 2 represents schematically a system which is designed to work on these principles. Figure 2 shows an enclosing chamber 12 filled with a suitable liquid, particularly one in which the speed of sound varies little or not at all with variations in temperature such as for example an alcohol solution of suitable concentration, and connected by entrant and exit openings 13 and 14 to wave guides 15 and 16 respectively. A vibrating rod 17 is provided in the chamber 12 and the motion of the rod is controlled by an electromagnet 18 to which the modulating signals are applied. The sound waves in the wave guide 15 may be generated in a number of ways, such as by the use of a crystal 19. The sound wave, generated by 19 is passed into the chamber 12 through wave guide 15 and entrant opening 13. After reflection from the vibrating rod 17, the sound waves are transferred through the exit opening 14, comprising, for example, a suitable membrane, and wave guide 16 for application to a load circuit such as a second crystal 20 where the sound wave may be transformed back into electrical signals.

It shall be understood that the relation between the movement of the reflecting surface and the modulation voltage shall be determined correctly in view of the effect desired conforming to the fundamental relation (1). If, for example, the frequency swing $\Delta F$ is made proportional to the frequency of the modulating signal, the speed V of displacement has to be proportional to the frequency of the modulating signal and the displacement itself will be proportional to the time integral of the signal. This can be taken into account by known methods of predistortion when the signal is applied to the modulating electrodes. If on the contrary, the displacement is made proportional to the signal, the frequency swing obtained is proportional to its derivative with respect to time, which means that correct phase modulation is achieved rather than frequency modulation.

While I have described above the principles of my invention in connection with specific apparatus, it is to be clearly understood that this description is made only by way of example and not as a limitation on the scope of my invention.

I claim:

1. A system for angularly modulating waves comprising an electron discharge device said device comprising a source of electrons, means for producing a space charge of said electrons, means for varying the density of the space charge in accordance with predetermined signals, a source of electromagnetic waves, means for directing said electromagnetic waves toward said space charge layer at an angle whereby said electromagnetic waves are reflected and means for receiving said reflected waves.

2. A system for angularly modulating waves comprising an electron discharge device, said electron discharge device comprising an emitter electrode, means for producing a space charge of electrons emitted by said electrode, means for varying the density of the space charge in accordance with predetermined signals, a source of electromagnetic waves, means for directing said electromagnetic waves toward said space charge layer at an angle whereby said electromagnetic waves are reflected, and means for receiving said reflected waves.

3. A system for angularly modulating waves comprising an electron discharge device in the form similar to a cylindrical magnetron, said magnetron comprising a centrally located cathode surrounded by a substantially cylindrical anode, means for producing a space charge layer substantially surrounding said cathode comprising a source of electrical modulation voltage applied between said anode and said cathode, means for controlling the rotation of said space charge layer about said cathode comprising magnetic means, a source of electromagnetic waves, means for directing said electromagnetic waves towards said space charge layer at an angle whereby said electromagnetic waves are reflected substantially from the surface of said space charge layer, means for varying the density and radius of said space charge layer comprising said modulation voltage whereby said reflected waves are angularly modulated, means for translating said reflected frequency modulated waves.

4. A system for angularly modulating waves comprising an electron discharge device in the form similar to a magnetron, said magnetron comprising a centrally located cathode substantially surrounded by an anode, means for producing a variable density and radius space charge layer substantially surrounding said cathode comprising a source of electrical modulation signals applied between said anode and said cathode, a source of electromagnetic waves, means for directing said electromagnetic waves towards said variable density and radius space charge layer at an angle whereby said electromagnetic waves are reflected from said variable density and radius space charge layer, said reflected waves being angularly modulated in accordance with modulation signals, and means for translating said reflected angularly modulated waves.

EMILE LABIN.

REFERENCES CITED

The following references are of record in the file of this patent:

UNITED STATES PATENTS

| Number | Name | Date |
| --- | --- | --- |
| 2,051,537 | Woff et al. | Aug. 18, 1936 |
| 2,085,406 | Zworykin | June 29, 1937 |
| 2,173,234 | Linder | Sept. 19, 1939 |
| 2,190,515 | Hahn | Feb. 13, 1940 |
| 2,290,587 | Goldstine | July 21, 1942 |
| 2,335,659 | Fraenckel et al. | Nov. 30, 1943 |
| 2,385,086 | D'Agostino et al. | Sept. 18, 1945 |
| 2,424,357 | Horsley | July 22, 1947 |
| 2,425,657 | Tunick | Aug. 12, 1947 |
| 2,511,106 | Fredholm et al. | June 13, 1950 |